United States Patent [19]

Le et al.

[11] Patent Number: 4,734,706

[45] Date of Patent: Mar. 29, 1988

[54] FILM-PROTECTED PRINT HEAD FOR AN INK JET PRINTER OR THE LIKE

[75] Inventors: Hue P. Le, Aloha; James C. Oswald, Beaverton, both of Oreg.

[73] Assignee: Tektronix, Inc., Beaverton, Oreg.

[21] Appl. No.: 838,240

[22] Filed: Mar. 10, 1986

[51] Int. Cl.⁴ .......... G01D 15/18

[52] U.S. Cl. .......... 346/1.1; 239/104; 346/140 R

[58] Field of Search .......... 346/140, 75, 1.1; 239/104, 102, 102.2

[56] References Cited

U.S. PATENT DOCUMENTS

| | | | |
|---|---|---|---|
| 3,924,974 | 12/1975 | Fischbeck | 346/75 |
| 3,940,773 | 2/1976 | Mizoguchi | 346/140 |
| 4,106,032 | 8/1978 | Miura | 346/140 |
| 4,196,437 | 4/1980 | Hertz | 346/75 X |
| 4,223,324 | 9/1980 | Yamamori | 346/140 |
| 4,231,046 | 10/1980 | Aiba | 346/75 |
| 4,301,460 | 11/1981 | Miura | 346/140 |
| 4,312,010 | 1/1982 | Doring | 346/140 |
| 4,343,013 | 8/1982 | Bader | 346/140 |
| 4,368,476 | 1/1983 | Uehara | 346/140 |
| 4,369,455 | 1/1983 | McConica | 346/140 |
| 4,380,018 | 4/1983 | Andoh | 346/140 |
| 4,417,259 | 11/1983 | Maeda | 346/140 |
| 4,420,764 | 12/1983 | Okada | 346/140 |
| 4,432,004 | 2/1984 | Glattli | 346/140 |
| 4,450,455 | 5/1984 | Sugitani | 346/140 |
| 4,450,456 | 5/1984 | Jekel | 346/140 |
| 4,458,255 | 7/1984 | Giles | 346/140 |
| 4,496,960 | 1/1985 | Fischbeck | 346/140 |
| 4,613,875 | 9/1986 | Le et al. | 346/140 R |

FOREIGN PATENT DOCUMENTS

| | | |
|---|---|---|
| 0110841 | 6/1984 | European Pat. Off. . |
| 0112701 | 7/1984 | European Pat. Off. . |
| 0121623 | 10/1984 | European Pat. Off. . |

OTHER PUBLICATIONS

Doring, M; Ink-Jet Printing, Philips Tech. Rev, 40, 192–198, 1982.

Lee et al., Drop-on-Demand Ink Jet Printing . . . and High Resolution; Proceedings of SPSE: Symposium on Non-Impact Printing, Jun. 1981, pp. 1059–1070.

Doring, M., Fundamentals of Drop Formation In DOD Systems, Gaynor, Advances in Non-Impact Printing . . . Applications, Rheinhold, N.J. pp. 1071–1090.

Suga et al., A New Pressure-Pulse Ink Jet Head . . . Valves, Gaynor, advances in Non-Impact Printing . . . Application, Rheinhold, N.J. pp. 1123–1146.

Roy et al; Drop Formation Characteristics of Drop-on-Demand Jets, Journal of Imaging Science, vol. 2, No. 2, Mar./Apr. 1985, pp. 65–68.

U.S. Patent Application Ser. No. 720,843, by Le et al.

*Primary Examiner*—Joseph W. Hartary

*Attorney, Agent, or Firm*—William S. Lovell; John D. Winkelman; John Smith-Hill

[57] ABSTRACT

A viscoelastic and ink-immiscible fluid is used to form a membrane over the ink orifice of a drop-on-demand, pressure pulse ink jet head. The membrane lies in a plane perpendicular to the direction of emission of ink drops, and provides a barrier between the ink orifice and the external atmosphere. Evaporation of the ink, or entry of contaminants including air into the ink, is thus inhibited. The elimination of evaporative clogging then permits the use of a smaller orifice. Wetting of the exterior surface of the ink jet head by the flow of ink through the ink orifice is also inhibited, thus making possible the production of more uniform ink drops that will emerge in a constant direction. The elastic property of the membrane permits the passage of an ink drop therethrough, followed by the closing up of the membrane. The viscous property of the membrane permits it to absorb any energy of a pressure pulse that is not consumed in ejecting an ink drop, thus inhibiting the occurrence of pressure oscillations that could cause either variations in the speed of ejected ink drops or the appearance of satellite ink droplets.

21 Claims, 13 Drawing Figures

FILM-PROTECTED PRINT HEAD FOR AN INK JET PRINTER OR THE LIKE

BACKGROUND OF THE INVENTION

1. Field of the Invention

This invention relates to a print head for an ink-jet printer or the like, and more specifically to a print head for forming small, single ink drops that are uniform in size and are unattended by satellite droplets.

2. Background Information

The drop-on-demand ink-let printer has provided a very quiet and rapid means for non-impact printing. However, the need for very precise production and control of the ink drops that will do the printing has required the development of a very complex and exacting technology. The ink to be used presents a variety of technical problems that require resolution in order to achieve the quality of printing desired.

Printing quality is determined both by the interaction between the ink and the medium upon which it is to be applied, and by the manner in which the ink is to be provided. For particular printing purposes, the ink-medium interaction will place contraints upon the specific types of ink that may be employed. Such constraints, in turn, will then place limits on the characteristics that the ink-ejection mechanism may be given.

For example, some of the inks to be employed may comprise a dispersion of solid particles within a liquid, typically water. The size of such particles will then impose an absolute minimum size that the ink-emitting orifice may have without becoming clogged. More than likely, however, clogging may still occur at such greater orifice sizes because of evaporation of the liquid medium. The more common inks to be employed will in fact comprise media containing dissolved dyes, and clogging will occur principally through evaporative precipitation of such dye-stuffs.

While in principle one might use a non-drying ink, such an ink will often not provide the printing quality desired. Consequently, the printing quality in terms of resolution is limited by the fact that the ink orifice must be made large enough to avoid such clogging. A large orifice will necessarily produce larger ink drops. Understandably, there has then been some effort to provide means by which such evaporative clogging might be minimized, if not eliminated entirely.

The means for so doing have included the use of some kind of mechanical cap over the ink orifice when it is not in use, coupled with frequent cleaning. U.S. Pat. No. 4,432,004, issued Feb. 14, 1984 to Glattli, exemplifies such an approach. An electromechanically controlled shutter mechanism for such purpose is described in U.S. Pat. No. 4,458,255, issued July 3, 1984 to Giles. An elaborate, cassette-like device for alternatively capping and cleaning the ink orifice is described in U.S. Pat. No. 4,450,456 issured May 22, 1984, to Jekel et al.

Quite a different technique is set forth in U.S. Pat. No. 4,196,437, issued Apr. 1, 1980, to Hertz. In order to avoid evaporation, the terminus of the nozzle through which the primary printing fluid is ejected is immersed within a secondary fluid. The presence of that secondary fluid prevents evaporation of primary fluid from that nozzle orifice, which may then be made smaller so as to produce smaller drops. The corresponding orifice leading from the secondary fluid into the air may then be made large enough so that evaporative clogging at that point will not occur, since the size of that second orifice bears no relation to the size of the drops that will be produced. However, it must also be noted that the Hertz device does not in fact produce single ink drops in the drop-on-demand fashion, but yields instead a continuous ink train that must then be broken up into drops.

The Hertz device is also intended to produce fluid drops that include quantities of both the primary and the secondary fluid. A clear and colorless primary fluid may then be used, which by mixture or chemical reaction with an entrained amount of secondary fluid will produce a colored ink of desired properties. The need to entrain a desired amount of secondary fluid onto a drop of primary fluid produced from the nozzle then requires that there be a particular distance through the secondary fluid that the drop of primary fluid will travel, i.e., there must exist a determinate and substantial distance between the nozzle terminus and the interface between the secondary fluid and the air. Since any variations in that distance will produce corresponding variations in the size and velocity of the drops produced, fairly elaborate means for maintaining that distance constant must be provided.

Another aspect of the Hertz device relates to the resolution of the printing that it will produce. To achieve high printing resolution requires not only drops of a small size, but also drops that may be closely packed. The need for a secondary fluid chamber, and a larger secondary fluid-air orifice, will not allow as great a printing drop density as might be achieved based upon the size of the primary nozzle alone.

U.S. Pat. No. 4,417,259, issued Nov. 22, 1983 to Maeda et al, describes the use of a reservoir external to the principal ink ejection orifice to prevent the evaporation of ink from that orifice. That reservoir alternatively contains either ink or air, and as in the Hertz device, has a second orifice to the air that is coaxial with and somewhat larger than the principal ink ejection orifice. Through gravity, air pressure, or a combination of both means, this secondary reservoir may be filled with air during periods of printing, or with ink when the printer is not in use. A covering body, or the surface tension of the ink itself, is used to prevent the leakage of ink from that second orifice. Air pressure may also be used as a means to remove any ink that may have dried around the periphery of that second orifice.

An additional problem with ink jet printing arises from the wetting, by the emerging ink, of the exterior surface of the nozzle or orifice plate of the ink jet head. The degree of such wetting may vary, since it depends in part upon the speed of the emerging drops, the drops that are slower to separate from the ink within the channel of the orifice having more opportunity to wet that surface. Subsequent drops may then add to, or subtract from, the wetting ink already present, thereby causing variations in the size of the emerging drops. This problem is also related to the nature of the inks employed, in that some of such inks may have been specifically provided with wetting agents, for purposes of quicker absorption by the medium upon which the ink is to be printed. In addition, as pointed out by M. Doring ("Ink-Jet Printing", *Philips Tech. Rev.* 40, 192–8, 1982), if such wetting is not symmetrical around the periphery of the orifice, the emerging ink drop will be drawn in the direction of the larger deposit of wetting ink, and its direction of propagation will be altered. For this reason as well, means for minimizing such wetting are required.

One way to decrease such wetting is to minimize the surface area on which it can take place. As also noted by Doring, the nozzle tip may be provided with a very short and thin extension tube that protrudes beyond the plane of the orifice plate. So long as the surface tension of the ink is not so low that the ink will flow out and surround that extension tube, it will only be on the very thin outer edge of such tube that external wetting can take place. That area can be made so small that as a practical matter, no wetting will occur. The disadvantage of such a method is found in the difficulty and expense of fabricating such extension tubes. When treating orifices having diameters on the order of 50 micrometer (μm) or less, very fine-scale manufacturing techniques, such as the electroless plating, grinding and selective etching processes described by Doring, are required.

An alternative method for minimizing such wetting is described in U.S. Pat. No. 4,368,476 issued on Jan. 11, 1983 to Uehara et al. In this method, the area surrounding the ink orifice is coated with a film of a fluorinated silane compound that will adhere to that surface area, but yet act as a repellent to both aqueous and non-aqueous inks. A similar technique is described in U.S. Pat. No. 4,343,013 issued on Aug. 3, 1982 to Bader et al., in which chromium, nickel and a polymer of the type sold under the name "Teflon" were also used as ink-repelling materials. In European Patent Application No. 83306260.7 of You, published Oct. 17, 1984, the use of imbedded ions in the nozzle surface for inhibiting wetting is described.

In U.S. Pat. No. 4,450,455, issued May 22, 1984 to Sugitani et al., the problem of ink wetting of the orifice plate is treated not by the elimination of such wetting, but rather by an effort to make it uniform. The outermost portion (about 50 μm) of the ink jet head is formed of a photoresist material, through which orifices are then formed using photolithography. The exterior surface of that photoresist material is made to protrude slightly, immediately around the periphery of the orifices. Also, except immediately around the orifices themselves, the exterior surface of that photoresist material is given a uniform degree of roughness by the imposition (also photolithographically) of a fine mesh pattern therein. A uniform wetting by ink of that exterior surface is then sought, in order that the formation of ink pools will be inhibited.

Yet another problem with respect to ink jet printing arises from the occurrence of oscillations within the ink chamber of the ink jet head. A pressure pulse intended to eject a single ink drop will be reflected back within the chamber, so that the ink supply, including that in the channel leading to the ink ejection orifice, will be displaced in an oscillatory manner. Subsequent ink drops will then emerge with an additional velocity component derived from such motion. The ink jet head is located at some fixed distance relative to the medium upon which printing is to occur, and relative movement between that medium and the ink jet head will be taking place. Any variations in velocity of the emerging ink drops will cause such ink drops to impinge upon the medium to be imprinted at locations that are displaced from the locations intended, and the quality of the printing produced will suffer thereby. Additional detail concerning the effect of motion in the meniscus at the ink orifice after ejection of an ink drop may be found in F. C. Lee et al., "Drop-On-Demand Ink Jet Printing At High Print Rates and High Resolution"; *Proceedings of SPSE: Symposium on Non-Impact Printing,* June 1981, pp. 1059–1070.

It has been further pointed out by M. Doring ("Fundamentals of Drop Formation in DOD Systems", in Joseph Gaynor, Ed., *Advances in Non-Impact Printing Technologies For Computer and Office Applications,* Van Nostrand Rheinhold, Princeton, N.J., 1981, pp. 1071–1090) that there will exist a critical degree of damping of such oscillations such as will minimize the appearance of those additional velocity components and their consequent adverse effects upon print quality. More precisely, such a critical level of damping will decrease to a minimum the time period required for the ink supply to return to its quiescent state.

The damping level required depends in part upon the frequency of the oscillations as determined by the resonant frequency of the system, including both the fluid system and the piezoelectric crystal or other pressure inducing device. The damping itself is brought about by viscous interaction in the fluid, including its interaction with the narrow channel through which the ink must pass in order to form an ejected drop. As noted in U.S. Pat. No. 4,312,010 issued Jan. 19, 1982 to Doring, excessive damping will result if there are air bubbles present in the ink, so the ink chamber must be designed in such a way that air bubbles will be excluded. With respect to other means for controlling such damping, there will exist practical limitations both in the viscosity range that the inks to be employed may have and in the dimensions that may be given to the channel leading to the ink jet nozzle.

Another consequence of pressure oscillations in the ink supply is the production of secondary or "satellite" ink droplets from a single pressure pulse. If a given pressure pulse is positively reinforced by a previous oscillation in nearly the same phase, the resultant pulse may be sufficiently long to produce not a single ink drop but a train of ink, which may then undergo spontaneous break-up into droplets due to varicose instability. Of course, the appearance of a desired ink drop could also be prevented by the occurrence of negative reinforcement from a previous pressure pulse. Alternatively, an oscillatory pulse may remain sufficiently strong that it will produce subsequent ink droplets in and of itself.

U.S. Pat. No. 4,369,455 issued Jan. 18, 1983 to McConica et al. employs two waveforms as a means of dampening pressure oscillations. That is, a first waveform is applied to the piezoelectric crystal to produce the desired ink drop, and then a second waveform is applied to dampen the oscillations caused by the first. The second waveform is oscillatory in nature, tuned not to the frequency of the first waveform but rather to the resonant frequency of the liquid system, and is applied in a phase nearly 180 degrees different from the natural oscillations derived from the first waveform so as to cancel them out. Both of such waveforms may also be composed at once by digital representation.

The use of one-way mechanical valves to dampen pressure oscillations has been described by M. Suga and M. Tsuzuki, "A New Pressure-Pulsed Ink Jet Head Using Two One-Way Micro-Mechanical Valves", in Joseph Gaynor, Ed., *Advances in Non-Impact Printing Technology for Computer and Office Applications,* Van Nostrand Rheinhold, Princeton, N.J., 1981, pp. 1123–1146. Using the configuration described, together with a "corrected" rather than a rectangular voltage pulse for ink drop ejection, the drop velocity as a function of operational frequency was found to be essentially constant up to 10 kHz. Such a valve is also described in European Patent Application No. 83307693.8 of Tsuzuki et al. published July 4, 1984.

Another approach to achieving proper damping of pressure waves is found in the use of auxiliary means for energy absorption, exemplified by European Patent Application No. 83830232.1 of Brescia published June 13, 1984. In this approach, a viscoelostic tube for energy absorption may be interposed between the ink reservoir and the terminal portion of the duct leading to the nozzle, or the duct may be surrounded by an elongate tube containing viscous fluid, such that the acoustic impedance of that container may be matched to that of the terminal portion of the duct.

In the case of ink drop ejectors of a tubular type, from which ink is ejected by electromechanical constriction of an ink-enclosing tube, internal pressure oscillations constitute less of a problem, since there is very little internal surface (from which reflections could arise) that is not active in controlling the pressure pulse itself. However, upon expansion of such an ejector following ink drop emission, air may be ingested into the ejector through the orifice. U.S. Pat. No. 4,496,960, issued Jan. 29, 1985 to Fischbeck, describes a system of check valves at the inlet and outlet of the ejector cavity which serves to prevent such air ingestion.

In U.S. Pat. No. 4,106,032, issued Aug. 8, 1978 to Miura et al., a device is described in which the character of the emerging ink drops is made to depend less upon the pressure pulses in the ink chamber itself than upon the assistance of a high speed jet of air. The device produces a train of ink droplets which the air flow then coalesces into a single drop. The air is also humidified to inhibit evaporation of the ink. In U.S. Pat. No. 4,301,460, issued Nov. 17, 1981 to Miura et al., an improvement of the aforesaid Miura et al. device is provided whereby transitory variations in the air pressure that could cause spontaneous ink emission or ink back blow are better controlled. In U.S. Pat. No. 4,223,324, issued Sept. 16, 1980 to Yamamori et. al., because a moistened air stream tends to blur the image printed, the problem of ink evaporation is treated instead by humidifying the air only when the ink jet head is not actually printing.

In U.S. patent application Ser. No. 720,843, filed Apr. 8, 1985 by Le et al. (now U.S. Pat. No. 4,613,875 on Sept. 23, 1986) and assigned to the assignee of the present invention, a projecting orifice outlet is employed not to prevent wetting, in the manner of Doring, but rather to place the emerging ink drop into the air stream so that the effect of that air flow can be substantially improved.

In U.S. Pat. No. 4,380,018, issued Apr. 12, 1983 to Andoh et al., the problem of pressure oscillations and of air ingestion during the printing process is treated by the use of separate fluid chambers. A first fluid, which need not be ink so long as it is not in communication with the second (ink) fluid, acts as a pressure transmission medium to convey the pressure pulses caused by the piezoelectric element to a thin, flexible sheet. That sheet then transmits such pulses on to a thin layer of ink contained in a second, narrow chamber, opposite to which is an ink ejection orifice. The pressure transmission medium is selected to have such viscosity as will dampen residual oscillations arising from the piezoelectric element.

In operating the Andoh et al. device, a negative pressure pulse is applied to the piezoelectric element in order to draw an excess of ink into the ink layer from an external source. Upon reversal of that pressure pulse, a similar amount of ink is ejected through the ink orifice in the form of an ink column that may break up into smaller ink drops at high frequency. Because of the rather small area of the flexible sheet as compared to the ink layer, and also because the ink layer is quite thin, air ingestion in the course of the ink ejection process is inhibited. Additional embodiments are described in which ink is used for both fluids, there being an ink passage connecting the two chambers, and in which the device may be operated horizontally without use of an orifice plate and orifice (and thus being similar to the Hertz device).

As additional background, and for purposes of evaluating the present invention on a quantitive basis, experiments in ink-drop ejection were then conducted using an apparatus of the type shown in FIG. 1. In that figure, an ink jet body 10 defines therein an ink chamber 12 and an ink supply inlet 14. As is typical in the art, ink jet body 10 is in the form of a cylinder short in its axial direction, and ink chamber 12 is generally horn-shaped or frusto-conical and symmetrical about the cylinder axis, with its small dimension at the end from which the ink is to be ejected. The purpose of the horn shape is to provide amplification of pressure pulses produced at the larger diameter end. The opposite end of ink chamber 12 is bounded by a diaphragm 16. Attached to the outer side of diaphragm 16, opposite to body 10, is a transducer 18, typically of a piezoelectric type, for imposition of pressure pulses onto the ink contained within ink chamber 12. However, it is also known to use a heat-generating element for that purpose. The precise nature of transducer 18 and the manner in which pressure pulses are transformed from the transducer to the ink chamber 12 are not material to the present invention, so the foregoing description should be deemed to be for illustrative purposes only. It is also immaterial with respect to the present invention that the ink may be contained in more than one chamber, as is shown in U.S. Pat. No. 3,940,773 issued Feb. 24, 1976 to Mizoguchi et al. and in several of the other publications mentioned.

At its end opposite to diaphragm 16, ink jet body 10 is attached to orifice plate 20, and an orifice 22 is included within plate 20. When a quantity of ink or like material has been provided to ink chamber 12 through inlet 14, an electrical signal applied to transducer 18 will cause a mechanical motion in diaphragm 16, and that motion will then be transmitted through the fluid within chamber 12 to cause the ejection of a small quantity of such fluid through orifice 22, thus producing, e.g., an ink drop 24.

Since the application of an anti-wetting coating to the exterior surface of an orifice plate such as 20 is already known to inhibit wetting thereon, and since the present invention also inhibits the wetting of orifice plate 20, it was necessary to isolate that anti-wetting effect in order to obtain a proper test of the additional aspects of the present invention. For that reason, the structure shown in FIG. 1A was also provided with an anti-wetting coating 26 on the outer surface of orifice plate 20, and in the near vicinity of orifice 22, as shown in FIG. 1B.

The effect of the anti-wetting coating 26 is then shown by a comparison of the ink drops produced by the respective devices shown in FIGS. 1A and 1B. To obtain such data, devices of both types were operated in a drop-on-demand mode at a frequency of 2 kHz. Orifice 22 was 40 μm in diameter, and an ink having a viscosity of approximately 2 cPs was employed. In the device of FIG. 1B, the anti-wetting material 26 was a polymer of the type sold under the trademark "Teflon", applied to a thickness of about 200 nanometers (nm) by vacuum evaporation.

The performance of each device in terms of drop formation was determined using a television camera and a stereomicroscope together with a strobe lamp to yield a series of back-lit images, on a black-and-white television monitor, of the emerging ink drops. Such images were then photographed using an oscilloscope camera to provide a permanent record of the events. Other methods of recording such data could of course be employed. Additional details of the experimental procedure may be found in "Drop Formation Characteristics of Drop-On-Demand Jets" by Joy Roy and Ronald L. Adams, *Journal of Imaging Science*, Vol. 2, No. 2, Mar/Apr, 1985, pp. 65–68. A comparison of these results is shown in FIG. 2.

Specifically, in FIG. 2A, there is shown a series of picture outlines, taken at 40 microsecond (μs) intervals, of the images produced as stated above when the television camera is aimed in a direction at right angles to the direction of ink drop propagation and thus parallel to the exterior surface of orifice plate 20. In obtaining the pictures of FIG. 2A, the device shown in FIG. 1A (not having an anti-wetting coating 26) was employed. Although a single voltage pulse intended to yield a single ink drop was applied, it is clear from FIG. 2A that a secondary ink train which may be expected to break up into satellite ink droplets is also produced. The source of that ink train is found in the bulky outline to the left in each of these figures, which shows an amount of ink that has flowed out upon and wetted the exterior surface of orifice plate 20.

In FIG. 2B is shown a corresponding set of figures that were obtained using the device as shown in FIG. 1B, i.e., including the anti-wetting coating 26. In order to illustrate the drop formation process in more detail, the images of FIG. 2B were taken at 10 s intervals, and then at intervals of 20 s in the latter part of the process, as shown in the drawing. The presence of the anti-wetting material 26 in the device of FIG. 1B can be seen to have had significant effect upon the drop formation process.

Specifically, in FIG. 2B there appears none of the wetting ink on the orifice plate surface that is seen in FIG. 2A. Secondly, the device of FIG. 1B produces a single ink drop, in that the ink that emerges from orifice 22 that does not go into making up the ink drop 24 flows back into the orifice. Finally, the single ink drop so produced is actually created at a much closer distance to the orifice 22 than in the case in which the anti-wetting material is absent. In spite of these advantages, however, continued experience with devices of the type shown in FIG. 1B indicates that they do not provide a complete solution to the problems in drop-on-demand ink jet printing that have previously been described.

The use of an anti-wetting coating provides no solution to the problems of evaporative clogging or the reflection of pressure waves within the ink chamber 12. Even with respect to preventing ink wetting, the use of anti-wetting materials such as polytetrafluoroethylene (e.g., the material sold under the trademark Teflon) do not provide a completely satisfactory solution. For example, it is difficult to achieve adequate adherence of the anti-wetting material 26 to the metal of the orifice plate 20. Under a scanning electron microscope, that material can be seen to be spongy (porous) when deposited in a manner as to provide the coating 26. Perhaps in part because of that, but no doubt also because of the surface active agents required in the ink (so as to wet the paper onto which printing will take place), the anti-wetting coating 26 will itself eventually become wetted through repeated use, and must then be replaced.

In addition, while it was not possible to present a simple illustration of the problem of evaporative clogging except to note that it occurs, the occurrence of back-and-forth oscillations of ink in the reservoir 12 upon production of an ink drop may be demonstrated by the same type of experimental procedure as was employed in obtaining the data illustrated in FIG. 2.

Specifically, there is shown in FIG. 3 a series of image outlines, taken at the time intervals as shown in the figure, of the ink drop production process using a device of the type shown in FIG. 1B (incorporating an anti-wetting coating 26) and using the same experimental set-up as was used to obtain the data of FIG. 2. In this particular case, the images were photographed at a short enough time interval (5 μs initially) and over a sufficient time period (145 μs) to show in greater detail the mechanics of the process. The occurrence of oscillations in the ink meniscus at the outlet of the ink orifice 22 can clearly be seen. As noted earlier, such oscillations can impose an additional velocity component onto subsequent ink drops and produce variations in the location of such drops upon the printed medium. While the use of an anti-wetting material 26 will inhibit the appearance of the kind of ink train as shown in FIG. 2A, it is clear from FIG. 3 that such procedure does not solve the problem of oscillations in the ink meniscus, and thus of variations in the velocity of propagation of the emerging ink drops.

In such a condition of the art, and without the need to combine in some complex fashion the methods that have just been described for solving each of the problems encountered in drop-on-demand ink jet printing individually, it would then be of particular value if there could be provided some simple means for addressing all of these problems simultaneously.

SUMMARY OF THE INVENTION

Exterior to the orifice plate of a drop-on-demand ink jet printer, there is provided an oil membrane which serves simultaneously (1) to prevent evaporative clogging of the orifice, (2) to prevent contamination of the ink by impurities from the air, (3) to prevent wetting of the orifice plate by the ink to be printed out, and (4) to minimize variations in velocity of the emerging ink drops. That oil membrane accomplishes such purposes (1) by providing a cover over the ink orifice 22, so that neither evaporation of the ink nor the entry of exterior foreign particles or air into the ink supply 12 can occur; (2) by itself wetting the orifice plate, thereby preventing the adhesion thereto of any of the ink (with which the oil membrane is immiscible); and (3) by the damping of oscillations in the ink meniscus at orifice 22, since the oil membrane is itself in contact with that ink meniscus and provides such damping through its own inertial and cohesive forces. The term "membrane" is intended generally to designate a thin film of viscoelastic fluid that performs those indicated functions.

DETAILED DESCRIPTION

Figure 4:
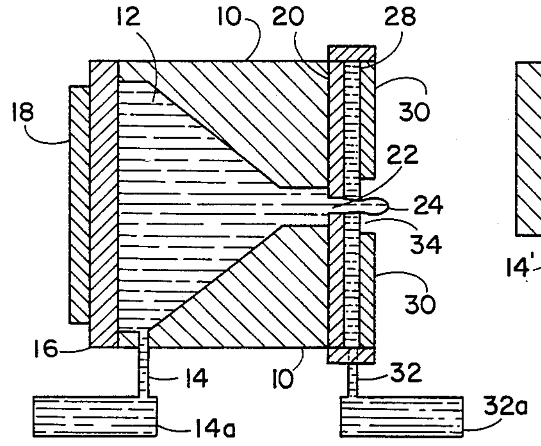
FIG. 4 shows in schematic form a longitudinal cross-section of an ink jet printer head according to one embodiment of the present invention.

FIG. 4 illustrates in schematic form an ink jet head according to the present invention. While the like-numbered components indicated correspond to those shown in FIG. 1, in FIG. 4 there appears in lieu of the anti-wetting coating 26 of FIG. 2 an oil membrane 28. A membrane container 30 serves to confine membrane 28 in a generally planar configuration adjacent to orifice plate 20 and its included orifice 22. Membrane container 30 also includes its own membrane orifice 34, which is concentric with and somewhat larger than the plate orifice 22. An oil supply tube 32 is used to provide the oil that makes up oil membrane 28.

For the sake of completion, FIG. 4 also shows an ink reservoir 14*a* and an oil reservoir 32*a* which are connected to and provide ink to ink supply tube 14 and liquid (oil) to oil supply tube 32, respectfully. While these reservoirs are shown as being external to the ink jet head, they could as well be internal, and their precise location is immaterial to the invention.

Figure 1A:
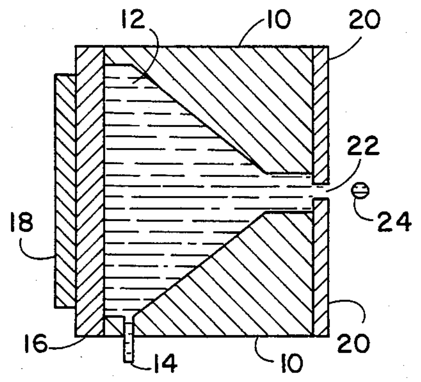
FIG. 1A PRIOR ART
FIGS. 1A and 1B show in schematic form a longitudinal cross-section of an ink jet printer head according to one aspect of the prior art, and is illustrated both without (FIG. 1A) and with (FIG. 1B) an additional anti-wetting agent.
Figure 1B:
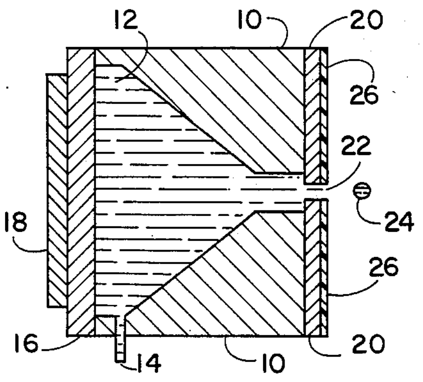
FIG. 1B PRIOR ART
Figure 2A:
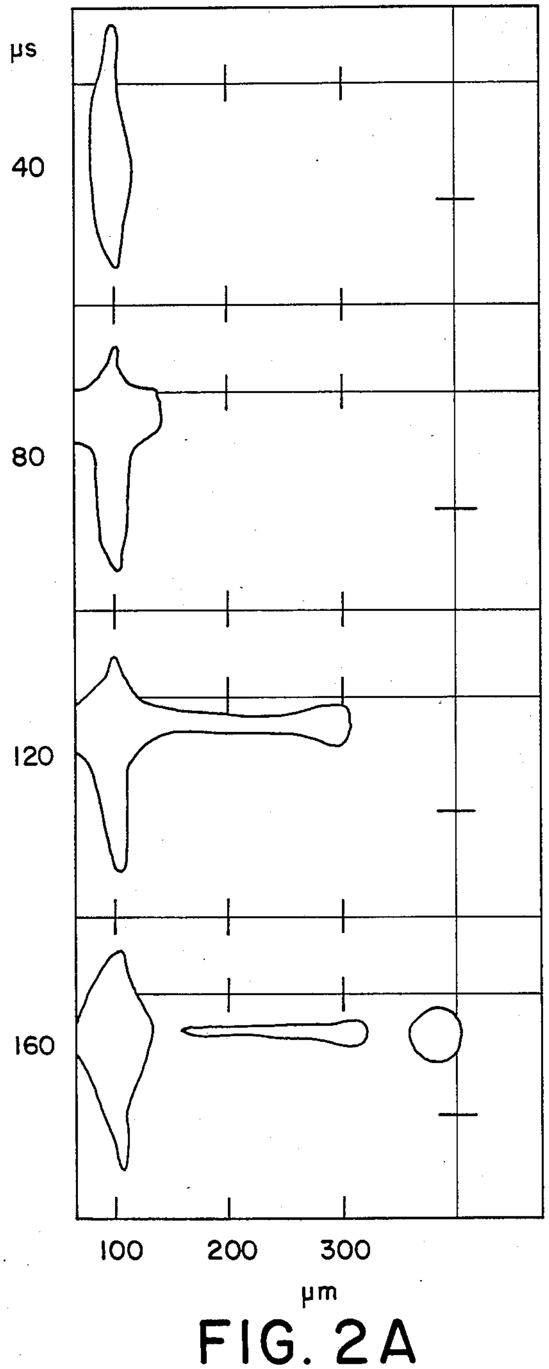
FIG. 2A PRIOR ART
FIGS. 2A and 2B show in outline reproduction, and in two series (a and b) of timed measurements, the course of the ink drop creation process when using devices of the respective types shown in FIGS. 1A and 1B.
Figure 2B:
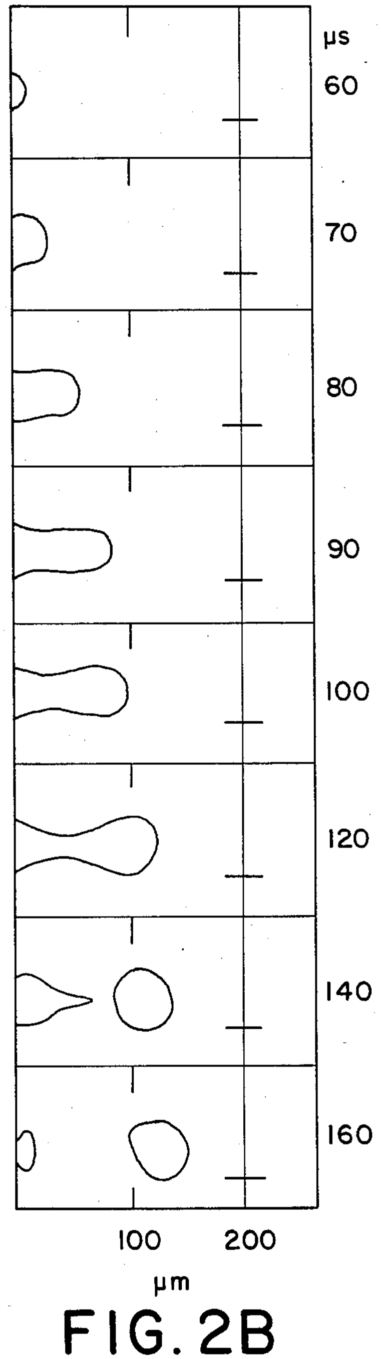
FIG. 2B PRIOR ART

In operation, an ink drop 24 is produced by the same means as in devices of the types shown in FIGS. 1A and 1B. In the case of an apparatus according to the present invention, however, an ink drop 24 will pass through the oil membrane 28 before emerging from the ink jet head. The presence of the oil membrane 28 then serves three distinct purposes.

In the first place, since the oil membrane 28 isolates the ink supply 12 generally and the orifice 22 specifically from the outside air, there is no evaporation of ink that could cause clogging of orifice 22 either by an accumulation of suspended particles from within the ink, or more likely by evaporative precipitation from the ink medium of dissolved dye-stuffs. Similarly, oil membrane 28 prevents the entry of dust particles from the air into orifice 22, which could also cause clogging. Oil membrane 28 likewise inhibits the entry of air into ink supply 12 through orifice 22.

Secondly, oil membrane 28 prevents wetting of the exterior surface of orifice plate 20 by ink from the orifice 22. The area of orifice plate 20 surrounding orifice 22 that might otherwise be wetted by ink is occupied instead by oil membrane 28. The adhesive forces existing between the fluid material of membrane 28 and orifice plate 20, together with the cohesive forces within membrane 28 itself, will generally prevent and ink from seeping out of orifice 22 and onto the surface of orifice plate 20. The material used to make up membrane 28 is selected so as to be completely immiscible with the ink appearing at orifice 22, so that the integrity of the membrane 28 will only be disrupted by the actual ejection of an ink drop, i.e., by the pressure pulse procedure as previously described.

Specifically, oil membrane 28 may comprise a silicone oil, which is generally taken to include the polydimethylsilicone polymers. As a class, such materials are chemically inert, have a low surface tension for wetting purposes, and may be obtained in forms having a wide range of viscosity values, depending primarily on the molecular weight of the particular polymers in the sample. The additional properties of being immiscible with water, and having both a high compressibility and a high shear stability, make them particularly useful in providing the oil membrane 28 of the present invention. These silicones are described generally by the chemical formula $$\begin{array}{ccccc} & CH_3 & CH_3 & CH_3 & \\ CH_3{-} & Si{-}O( & {-}Si{-}O)_n & {-}Si & {-}CH_3, \\ & CH_3 & CH_3 & CH_3 & \end{array}$$

wherein the integer n may have values of from about 200 to 800, preferably about 500, and substituent groups other than methyl may also appear. As noted, the viscosity of a particular sample is determined largely by the molecular weight of its constituent molecules, which depends upon the value of n as well as upon the possible presence of substituent groups other than methyl on the polymer chain. That viscosity may also be affected by the occurrence of cross-linking between polymer chains. The apparatus of FIG. 4 has been employed successfully using silicone materials having viscosities in the range of 10–50 cPs.

Within that range of viscosities, proper ink drop ejection has been achieved using oil membranes 28 having thicknesses of up to about 100 μm, although operation appears to occur best at thicknesses in the range of 50–75 μm. Beyond about 100 μm, the oil membrane 28 was found to present so much barrier that an ink drop could not break through it and emerge to the outside. Also, oil membrane 28 must be thin enough so as not to encroach upon the domain in which separation of the separate ink drops is to occur, as will subsequently be shown.

The expressed thickness of 100 μm, however, should likewise not be construed as a specific limitation on the scope of the invention, since that thickness will depend, inter alia, upon the cohesive forces within membrane 28, which in turn will depend upon the value of n as aforesaid, the nature of the substituent groups, and upon cross-linking.

Similarly, the stated range of viscosities should not be taken as any limitation on the scope of the invention. The appropriate thickness of the oil membrane 28 and the appropriate viscosity of the material used to make up membrane 28 are mutually dependent quantities with respect to the optimum performance of the invention. The thickness of oil membrane 28 through which one can eject an ink drop will also depend upon the magnitude of the voltage applied to transducer 18.

It is the spacing of membrane container 30 relative to orifice plate 20 that largely determines the thickness of membrane 28. The thickness of membrane 28 in the immediate vicinity of orifice 22 will also depend in part on the size of membrane orifice 34, i.e., the surface tension of the material comprising membrane 28 may cause membrane 28 to be somewhat thinner in the center of membrane orifice 34 than at its edges. Membrane orifice 34 must then (1) be larger in size than orifice 22 and the emerging ink drops 24, and (2) be sufficiently small in size that the surface tension of the material comprising membrane 28 will be obliged to work over a small enough area that the membrane 28 can in fact be maintained.

Figure 5:
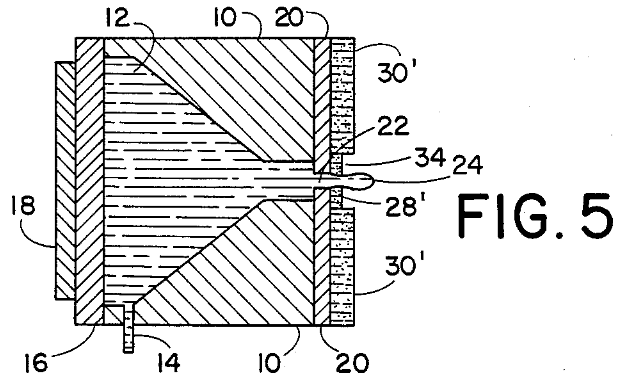
FIG. 5 shows in schematic form a longitudinal cross-section of an alternative embodiment of the present invention.

The only purpose of oil supply tube 32 is to supply the material necessary to take up the membrane 28. Thus, an alternative embodident of the invention is shown in FIG. 5, in which the oil supply tube 32 is omitted and the material necessary to form membrane 28 is supplied instead by a modified version of the membrane container 30′. That is, the membrane container 30′ comprises a micro-porous material that is soaked in a membrane material such as the silicone oil previously described. By capillary action, an amount of such oil sufficient to wet the orifice plate 20 and thus seep together and form a 34. A membrane 28′ over the orifice 22 will become available at the periphery of the container orifice membrane 28′ having once been formed, the operation of the apparatus as shown in FIG. 5 is then the same as that of the apparatus shown in FIG. 4.

Figure 6:
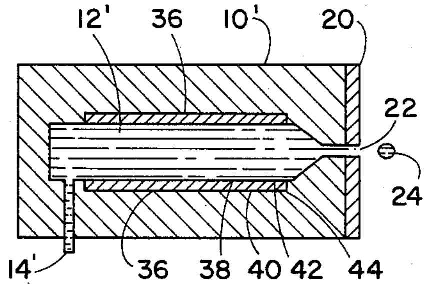
FIG. 6 shows in schematic form an alternative embodiment of the present invention which includes an elongate cylindrical ink chamber.

In FIG. 6, an additional embodiment of the invention is shown using a print head of a type similar to that described by Fischbeck and noted earlier. That is, the somewhat differently-shaped ink jet body 10′ incorporates an elongate, cylindrical ink chamber 12′, into which there leads a suitably adapted ink supply inlet 14′. Of course, such ink supply inlet 14′ could as well be located coaxially with the ink chamber 12′. The orifice plate 20 and orifice 22 function identically to the manner previously described in producing an ink drop 24.

In this embodiment, however, the pressure pulse that creates the ink drop 24 is provided by an elongate and cylindrical transducer 36, which surrounds ink chamber 12′ through a substantial portion of the long dimension thereof. Transducer 36 may comprise two concentric, conducting sleeves located one inside the other and having electrical connections 38 and 40 thereto, respectively. The inner 42 and outer 44 facing surfaces of those sleeves are electrically conductive so that the application of an appropriate voltage to connections 38 and 40 will cause a displacement of surfaces 42 and 44 relative to each other, thereby causing a pressure impulse to be applied to the ink contained within ink chamber 12′. Alternatively, one may use a thermal transducer (not shown) which will likewise have electrical connections 38 and 40, but which operates by thermal expansion upon application of a voltage pulse and again causes a pressure pulse within ink chamber 12′.

Figure 7A:
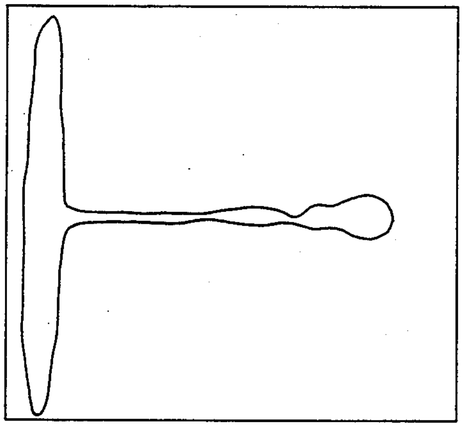
FIG. 7A PRIOR ART
FIGS. 7A and 7B show in outline form the production of an ink drop using devices of the type shown in FIGs. 1A and 4, respectively.
Figure 7B:
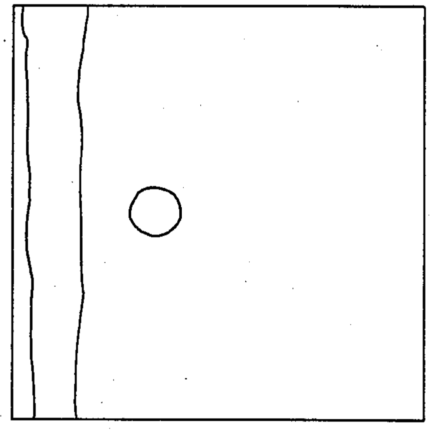
FIG. 7B PRIOR ART

FIG. 7 illustrates the effect of using an oil membrane 28 (or 28′) in an apparatus of the type shown in FIG. 4. In FIG. 7A, and based upon the same photographic technique as was previously described, there is shown in outline form the appearance of an ink drop produced from the same apparatus as was used to produce the results shown in FIG. 2A, i.e., the device of FIG. 1A in which no effort is made to prevent wetting by ink of the exterior surface of orifice plate 20. As already seen in FIG. 1A, the occurrence of an ink train that can degrade the integrity of the ink drop being produced is clearly visible in FIG. 7A. By contrast, in FIG. 7B, results taken from an apparatus of the type shown in FIG. 4, i.e., incorporating the oil membrane 28, show no such ink train, but rather a distinct and isolated ink drop. The distance from the orifice plate at which that distinct ink drop separates is primarily a function of the surface tension of the ink itself. Oil membrane 28 must not be so thick as to encroach upon such domain, otherwise the separation of the ink drop would be inhibited by competing adhesive forces with respect to the membrane material.

The bulky outlines to the left in each of FIGS. 7A and 7B constitute an amount of wetting ink and the actual oil membrane 28 (or 28′), respectively. By comparison of the results shown in FIGS. 2B and 7B, it can be seen that the oil membrane 28 is every bit as effective as the anti-wetting material 26 of FIG. 1B in preventing the seepage of ink from orifice 22 that would degrade the integrity of the ink drops produced.

Figure 3:
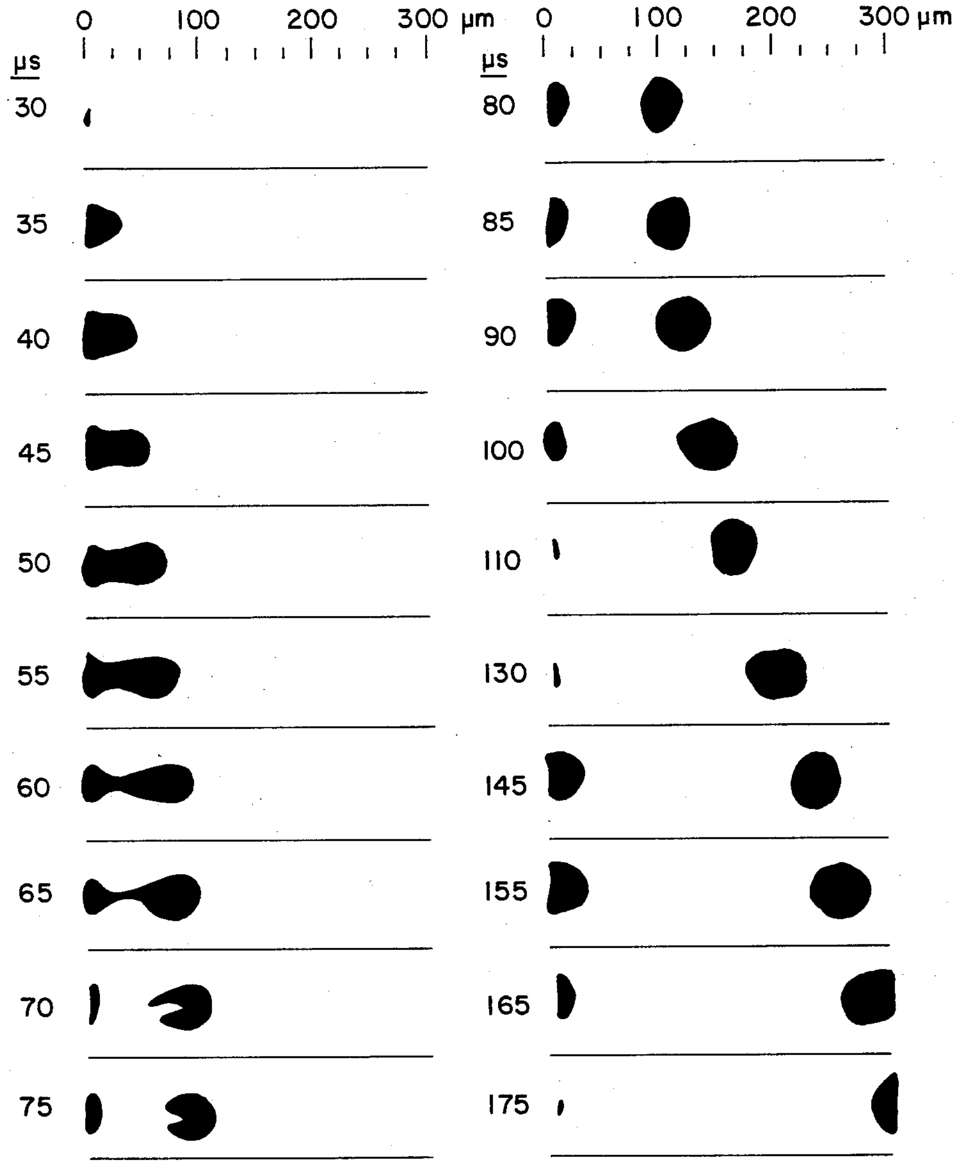
FIG. 3 PRIOR ART
FIG. 3 shows in outline reproduction, in a single series of timed measurements, the course of the ink drop creation process when using a device of the type shown in FIG. 1B, in a manner which depicts the occurrence of oscillations in the ink supply upon the production of an ink drop.

Finally, oil membrane 28 serves to damp the oscillations caused in the ink supply 12 by the pressure pulses that produce each ink drop 24. That fact may not be demonstrated by the generation of a series of photographs corresponding to those of FIG. 3, in which such oscillations as the ink meniscus may be seen, for the reason that when the oil membrane 28 is present the ink meniscus at orifice 22 is no longer visible. Nevertheless, such an effect can be deduced from the mechanics of the drop production process. Though difficult of illustration, that effect can also be seen in the quality of printing that one is able to produce.

Figure 8A:
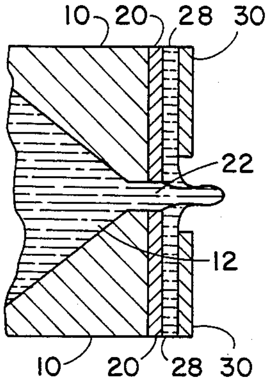
FIGS. 8A, 8B and 8C show in outline form the mechanics of the ink drop production process when using a device of the type shown in FIG. 4.
Figure 8B:
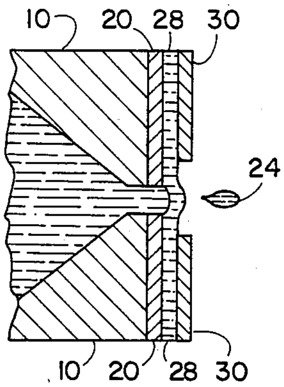
Figure 8C:
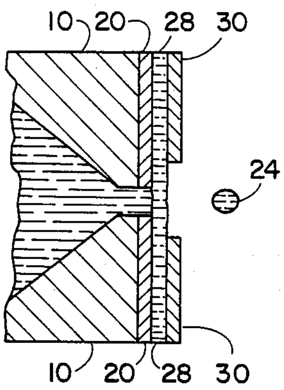

The principal steps of that process are shown in FIG. 8. In general, upon the occurrence of a pressure pulse, a quantity of ink that will form the ink drop 24 is forced into the membrane 28, the fluid of which is displaced in order to make way for the passage of that ink, as shown in FIG. 8A. Upon release of the ink drop 24, the membrane 28 then commences to collapse, as shown in FIG. 8B, until it reaches the quiescent state shown in FIG. 8C. The efficacy of this process depends upon the visco-elastic properties of the fluid comprising membrane 28.

That is, it appears that the elastic property of the fluid requires it to re-form the original membrane 28 upon passage of an ink drop 24, and then the viscous property of the fluid permits it to act as an "energy sink". The pressure wave which produces the ink drop 24, to the extent that it is not reflected near the orifice 22, will be propagated on into the oil membrane 28. The material comprising membrane 28 is selected to have a viscosity sufficient so that it will act as an energy sink, and thus essentially all of the pressure energy it receives that is not used in accelerating the ink drop 24 will be dissipated within oil membrane 28. The quality of printing produced by an apparatus of the type shown in FIG. 4 indicates that no such reverberations of that pressure pulse occur, but instead that the ink drops 24 leave the print head with essentially uniform velocity.

By the single and very simple expedient of providing the oil membrane 28 (or 28'), the present invention then addresses successfully the four problems of evaporative clogging, ink contamination, ink wetting and a nonuniform drop velocity that have plagued the ink jet printing art and that up until now have required the somewhat elaborate and expensive means for resolution thereof that have been described. While the invention has been described in terms of specific embodiments and drawings thereof, these are not intended as limitations on the scope of the invention. In particular, though described in terms of an ink jet printer head, it will be clear that the principles of the invention will be applicable to any kind of system which requires a controlled ejection of minute drops of fluid, whether upon a passing print drum or for any other purpose such as, e.g., thin film deposition. Therefore, all such variations from or modifications to the embodiments shown herein are intended to be included within the scope of the invention, as expressed in the claims appended hereto.

We claim:

1. A print head comprising a print head body defining a horn-shaped fluid chamber having a wide end and an opposite narrow end, an orifice plate attached to the print head body at the narrow end of said fluid chamber, forming a containing wall thereto and defining an orifice in communication with said fluid chamber and opening in the direction of the external atmosphere, a fluid supply tube connected to said fluid chamber, a fluid reservoir connected to said fluid supply tube and adapted to provide a continuous supply of fluid through said fluid supply tube to said fluid chamber, a pressure diaphragm attached to the print head body at the wide end of said fluid chamber and forming a containing wall thereto, a piezoelectric element attached to said pressure diaphragm on the opposite side thereof to said fluid chamber, said piezoelectric element being adapted to apply a mechanical pressure to the fluid contained within said fluid chamber for causing ejection of fluid through said orifice, upon application of a voltage to said piezoelectric element, a liquid membrane lying perpendicular to the axis of said orifice and separating said orifice from the external atmosphere, a membrane plate adapted for the containment of said membrane in a plane parallel to and adjacent to said orifice plate, a liquid supply tube connected to said membrane plate at a location adapted to provide liquid for the formation of said membrane, and a liquid reservoir connected to said liquid supply tube and adapted to provide a continuous supply of liquid through said liquid supply tube to said membrane plate for the formation of said liquid membrane, said liquid being a polysilicone material having the general formula $$\begin{array}{ccc} CH_3 & CH_3 & CH_3 \\ CH_3\text{—}Si\text{—}O( & \text{—}Si\text{—}O)_n & \text{—}Si\text{—}CH_3 \\ CH_3 & CH_3 & CH_3 \end{array}$$

wherein n is an integer having a value in the range of about 200 to 800.

2. The device of claim 1 wherein n has a value of approximately 500.

3. A printing device comprising:

a print head body defining a fluid chamber and an orifice in communication with the fluid chamber and opening in the direction of the external atmosphere, a non-gaseous fluid in the fluid chamber, a liquid membrane separating the orifice from the external atmosphere, the liquid of the membrane being substantially immiscible with the non-gaseous fluid, and pressure means for ejecting the non-gaseous fluid from the fluid chamber through the orifice and through the liquid membrane.

4. The device of claim 3, wherein the non-gaseous fluid is a liquid and the liquid of the membrane is a silicone oil.

5. The device of claim 4, wherein the silicone oil is a polydimethyl silicone polymer.

6. The device of claim 4, wherein the silicon oil has a viscosity in the range from about 10 to 50 centipoise.

7. The device of claim 3, wherein the liquid comprises a polysilicone material having the general formula $$\begin{array}{ccc} CH_3 & CH_3 & CH_3 \\ CH_3\text{—}Si\text{—}O( & \text{—}Si\text{—}O)_n & \text{—}Si\text{—}CH_3 \\ CH_3 & CH_3 & CH_3 \end{array}$$

wherein n is an integer having a value in the range of about 200 to 800.

8. The device of claim 3, wherein the print head body comprises a first member which defines the fluid chamber and a second member which is attached to the first member and defines the orifice.

9. The device of claim 8, wherein the second member is an orifice plate and the device further comprises a membrane plate in spaced, parallel relationship with the orifice plate, the membrane being between the orifice plate and the membrane plate.

10. The device of claim 8, wherein the second member is an orifice plate and the device further comprises a membrane plate adjacent to the orifice plate and disposed parallel thereto, the membrane plate being made of microporous material which is soaked in the liquid of the membrane.

11. A printing device comprising:

a print head body defining a fluid chamber and an orifice in communication with the fluid chamber and opening in the direction of the external atmosphere, a reservoir containing a non-gaseous fluid, the reservoir being in communication with the fluid chamber, a liquid membrane separating the orifice from the external atmosphere, the liquid of the membrane being substantially immiscible with the non-gaseous fluid, and pressure means for ejecting fluid from the fluid chamber through the orifice and through the membrane.

12. The device of claim 11, wherein the non-gaseous fluid is a liquid and the liquid of the membrane is a silicone oil.

13. The device of claim 12, wherein the silicon oil is a polydimethyl silicone polymer.

14. The device of claim 12, wherein the silicone oil has a viscosity in the range from about 10 to 50 centipoise.

15. The device of claim 11, wherein the liquid comprises a polysilicone material having the general formula $$\begin{array}{ccccc} & CH_3 & & CH_3 & & CH_3 \\ CH_3\text{—} & Si & \text{—O(—} & Si & \text{—O)}_{\underline{n}}\text{—} & Si & \text{—}CH_3 \\ & CH_3 & & CH_3 & & CH_3 \end{array}$$

wherein n is an integer having a value in the range of about 200 to 800.

16. The device of claim 11, wherein the print head body comprises a first member which defines the fluid chamber and a second member which is attached to the first member and defines the orifice.

17. The device of claim 16, wherein the second member is an orifice plate and the device further comprises a membrane plate in spaced, parallel relationship with the orifice plate, the membrane being between the orifice plate and the membrane plate.

18. The device of claim 16, wherein the second member is an orifice plate and the device further comprises a membrane plate adjacent to the orifice plate and disposed parallel thereto, the membrane plate being made of microporous material which is soaked in the liquid of the membrane.

19. A method of operating a printing device which comprises a print head body defining a fluid chamber and an orifice in communication with the fluid chamber and opening in the direction of the external atmosphere, a non-gaseous fluid in the fluid chamber, and pressure means which are actuable for ejecting the non-gaseous fluid from the fluid chamber through the orifice, said method comprising:

providing a liquid membrane separating the orifice from the external atmosphere, the liquid of the membrane being substantially immiscible with said non-gaseous fluid, and actuating the pressure means for ejecting said non-gaseous fluid from the fluid chamber through the orifice and through the membrane.

20. A method according to claim 19, wherein the liquid of the membrane has a viscosity of at least 10 centipoise.

21. A method according to claim 19, wherein the liquid of the membrane is a polysilicone material having the general formula $$\begin{array}{ccccc} & CH_3 & & CH_3 & & CH_3 \\ CH_3\text{—} & Si & \text{—O(—} & Si & \text{—O)}_{\underline{n}}\text{—} & Si & \text{—}CH_3 \\ & CH_3 & & CH_3 & & CH_3 \end{array}$$

wherein n is an integer having a value in the range of about 200 to 800.

* * * * *